(12) United States Patent
Atassi et al.

(10) Patent No.: US 10,302,042 B2
(45) Date of Patent: May 28, 2019

(54) VARIABLE AREA FAN NOZZLE WITH WALL THICKNESS DISTRIBUTION

(71) Applicant: United Technologies Corporation, Farmington, CT (US)

(72) Inventors: Oliver V. Atassi, Longmeadow, MA (US); Oleg Petrenko, Danbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 398 days.

(21) Appl. No.: 15/177,657

(22) Filed: Jun. 9, 2016

(65) Prior Publication Data

US 2017/0058827 A1    Mar. 2, 2017

Related U.S. Application Data

(60) Continuation of application No. 13/834,123, filed on Mar. 15, 2013, now Pat. No. 9,394,852, which is a
(Continued)

(51) Int. Cl.
*F02K 1/06*    (2006.01)
*F02K 1/15*    (2006.01)
(Continued)

(52) U.S. Cl.
CPC ............ *F02K 1/15* (2013.01); *F02C 3/04* (2013.01); *F02C 7/36* (2013.01); *F02K 1/06* (2013.01);
(Continued)

(58) Field of Classification Search
CPC ...... F02K 1/15; F02K 1/06; F02K 1/82; F02K 3/06; F02C 7/36
See application file for complete search history.

(56) References Cited

U.S. PATENT DOCUMENTS 3,287,906 A    11/1966 McCormick
3,527,317 A    9/1970 Motsinger
(Continued)

FOREIGN PATENT DOCUMENTS

GB    1516041       6/1978
GB    2041090       9/1980
WO    2007038674    4/2007

OTHER PUBLICATIONS

European Search Report for European Patent Application No. 13767469 completed May 31, 2016.
(Continued)

*Primary Examiner* — Carlos A Rivera
(74) *Attorney, Agent, or Firm* — Carlson, Gaskey & Olds, P.C.

(57) ABSTRACT

A gas turbine engine includes a core engine that has at least a compressor section, a combustor section and a turbine section disposed along a central axis. A fan is coupled to be driven by the turbine section. A fan nozzle is aft of the fan and defines an exit area. The fan nozzle has a body that defines an airfoil cross-section geometry. The body includes a wall that has a controlled mechanical property distribution that varies by location on the wall in accordance with a desired flutter characteristic at the location.

12 Claims, 4 Drawing Sheets

Related U.S. Application Data continuation-in-part of application No. 13/742,647, filed on Jan. 16, 2013, now Pat. No. 9,429,103, which is a division of application No. 13/363,219, filed on Jan. 31, 2012, now Pat. No. 8,375,699.

(51) Int. Cl.

| | | |
|---|---|---|
| *F02K 1/82* | (2006.01) | |
| *F02C 3/04* | (2006.01) | |
| *F02C 7/36* | (2006.01) | |
| *F02K 3/06* | (2006.01) | |

(52) U.S. Cl.
CPC ............... *F02K 1/82* (2013.01); *F02K 3/06* (2013.01); *F05D 2220/323* (2013.01); *F05D 2240/35* (2013.01); *F05D 2260/81* (2013.01); *F05D 2300/173* (2013.01); *F05D 2300/6033* (2013.01); *Y02T 50/672* (2013.01)

(56) References Cited

U.S. PATENT DOCUMENTS

| | | | |
|---|---|---|---|
| 3,754,484 A | 8/1973 | Roberts | |
| 3,806,068 A * | 4/1974 | Blythe | B64C 29/0066 244/12.5 |
| 3,892,358 A | 7/1975 | Gisslen | |
| 4,130,872 A | 12/1978 | Harloff | |
| 4,178,667 A | 12/1979 | Stevens et al. | |
| 4,826,106 A | 5/1989 | Anderson | |
| 5,127,802 A | 7/1992 | Carlson et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,718,752 B2 | 4/2004 | Nesbitt et al. | |
| 6,735,936 B2 | 5/2004 | Rey et al. | |
| 6,814,541 B2 | 11/2004 | Evans et al. | |
| 6,920,958 B2 | 7/2005 | Harrison | |
| 7,021,042 B2 | 4/2006 | Law | |
| 7,082,371 B2 | 7/2006 | Griffin et al. | |
| 7,093,645 B2 | 8/2006 | Grunstra et al. | |
| 7,206,709 B2 | 4/2007 | Griffin et al. | |
| 7,234,506 B2 | 6/2007 | Grunstra et al. | |
| 7,278,460 B2 | 10/2007 | Grunstra et al. | |
| 7,383,136 B1 | 6/2008 | Griffin et al. | |
| 7,591,754 B2 | 9/2009 | Duong et al. | |
| 7,617,166 B2 | 11/2009 | Haudrich et al. | |
| 7,694,505 B2 | 4/2010 | Schilling | |
| 7,716,932 B2 | 5/2010 | Core | |
| 7,721,551 B2 | 5/2010 | Hanson | |
| 7,753,652 B2 | 7/2010 | Truckenmueller et al. | |
| 7,824,305 B2 | 11/2010 | Duong et al. | |
| 7,926,260 B2 | 4/2011 | Sheridan et al. | |
| 8,156,727 B2 | 4/2012 | Dijoud et al. | |
| 8,205,432 B2 | 6/2012 | Sheridan | |
| 8,375,699 B1 | 2/2013 | Atassi | |
| 2002/0064458 A1 | 5/2002 | Montgomery et al. | |
| 2004/0243310 A1 | 12/2004 | Griffin et al. | |
| 2007/0284411 A1 | 12/2007 | Luczak | |
| 2008/0159856 A1 | 7/2008 | Moniz et al. | |
| 2008/0256957 A1 * | 10/2008 | Webster | B64D 29/00 60/770 |
| 2009/0053058 A1 | 2/2009 | Kohlenberg et al. | |
| 2009/0067993 A1 | 3/2009 | Roberge et al. | |
| 2009/0099796 A1 | 4/2009 | Yang et al. | |
| 2010/0014932 A1 | 1/2010 | Albisson et al. | |
| 2010/0050595 A1 | 3/2010 | Migliaro, Jr. et al. | |
| 2010/0064659 A1 | 3/2010 | Wang | |
| 2010/0107600 A1 | 5/2010 | Hillel et al. | |
| 2010/0126139 A1 | 5/2010 | Howe | |
| 2010/0148396 A1 | 6/2010 | Xie et al. | |
| 2010/0170746 A1 | 7/2010 | Restuccia | |
| 2010/0331139 A1 | 12/2010 | McCune | |
| 2011/0052405 A1 | 3/2011 | Parkin | |
| 2011/0052406 A1 | 3/2011 | Bruce | |
| 2011/0120080 A1 * | 5/2011 | Schwark, Jr. | F02K 1/09 60/226.3 |
| 2012/0011825 A1 | 1/2012 | Hall et al. | |
| 2013/0020408 A1 | 1/2013 | Jasklowski et al. | |
| 2013/0036611 A1 * | 2/2013 | Hanna | B21D 53/88 29/897.2 |

OTHER PUBLICATIONS

European Supplementary Search Report for European Patent Application No. 14768410 completed Oct. 5, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

(56) References Cited

OTHER PUBLICATIONS

Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
International Preliminary Report on Patentability for PCT Application No. PCT/US2013/020460, dated May 14, 2015.
International Preliminary Report on Patentability for PCT Application No. PCT/US2014/023232 dated Sep. 24, 2015.
International Search Report and Written Opinion for International Application No. PCT/US2013/020460 completed on Oct. 16, 2013.
International Search Report and Written Opinion for International Application No. PCT/US2014/023232 dated Jul. 10, 2014.

* cited by examiner

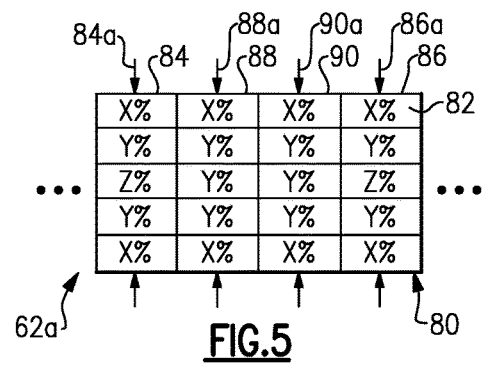
FIG.5
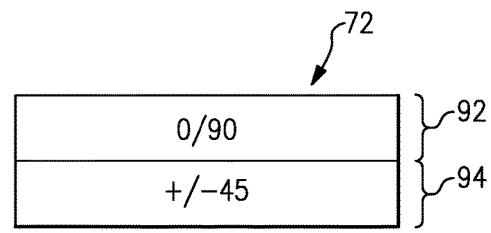
FIG.6
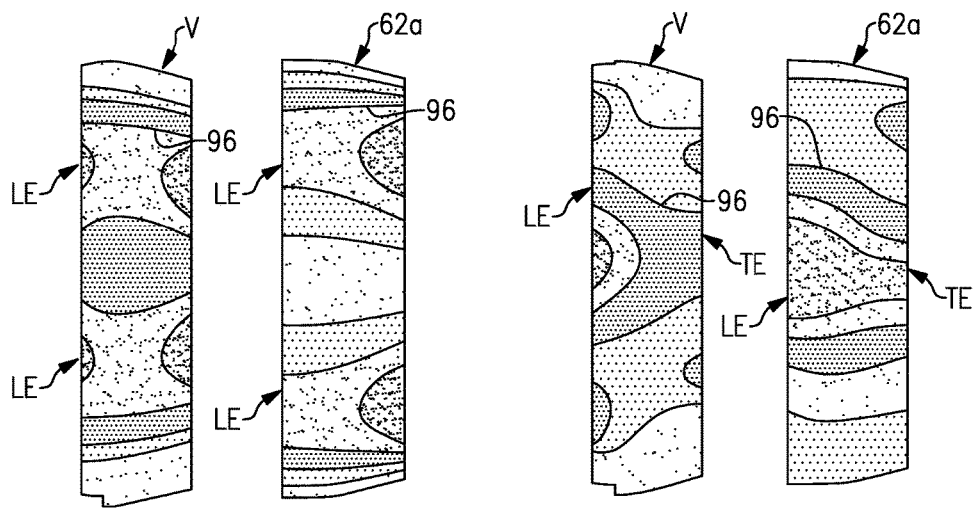
FIG.7A  FIG.7B  FIG.8A  FIG.8B

VARIABLE AREA FAN NOZZLE WITH WALL THICKNESS DISTRIBUTION

CROSS REFERENCE TO RELATED APPLICATIONS

The present disclosure is a Continuation of application Ser. No. 13/834,123, filed Mar. 15, 2013, which is a Continuation-In-Part of application Ser. No. 13/742,647, filed Jan. 16, 2013, which is a divisional of application Ser. No. 13/363,219, filed Jan. 31, 2012, now issued as U.S. Pat. No. 8,375,699.

BACKGROUND

The present disclosure relates to gas turbine engines and, more particularly, to a variable area fan nozzle of a gas turbine engine.

A typical gas turbine engine includes a fan section that is driven by a core engine. The fan section drives air through an annular bypass passage. The air is discharged through a fan nozzle. In some designs, the fan nozzle is moveable to selectively change a nozzle exit area of the fan nozzle and influence operation of the fan section, for example.

SUMMARY

A gas turbine engine according to an example of the present disclosure includes a core engine that has at least a compressor section, a combustor section and a turbine section disposed along a central axis, a fan coupled to be driven by the turbine section, and a fan nozzle aft of the fan and defining an exit area. The fan nozzle has a body defining an airfoil cross-section geometry. The body includes a wall that has a controlled mechanical property distribution that varies by location on the wall in accordance with a desired flutter characteristic at the location.

In a further embodiment of any of the foregoing embodiments, the controlled mechanical property distribution is defined by a variation in material chemical composition of the wall.

In a further embodiment of any of the foregoing embodiments, the controlled mechanical property distribution is defined by a variation in resin compositions, a variation in metallic alloy compositions, or a variation in ceramic compositions.

In a further embodiment of any of the foregoing embodiments, the controlled mechanical property distribution is defined by a variation between any two of resin composition, metallic alloy composition and ceramic composition.

In a further embodiment of any of the foregoing embodiments, the controlled mechanical property distribution is defined by a variation in metallic grain structure.

In a further embodiment of any of the foregoing embodiments, the controlled mechanical property distribution is defined by a variation in a micro-structure of the wall.

In a further embodiment of any of the foregoing embodiments, the wall includes a cured material and the controlled mechanical property distribution is defined by a variation in curing of the cured material.

In a further embodiment of any of the foregoing embodiments, the wall has an undulating wall thickness distribution that defines the controlled mechanical property distribution.

In a further embodiment of any of the foregoing embodiments, the undulating wall thickness distribution has multiple thickness zones defining a maximum thickness and a minimum thickness, and the minimum thickness is less than 80% of the maximum thickness.

In a further embodiment of any of the foregoing embodiments, the minimum thickness is less than 40% of the maximum thickness.

In a further embodiment of any of the foregoing embodiments, the multiple thickness zones define an intermediate thickness with respect to the minimum thickness and the maximum thickness, and the intermediate thickness is from 40% to 60% of the maximum thickness.

In a further embodiment of any of the foregoing embodiments, the wall is a composite material.

In a further embodiment of any of the foregoing embodiments, the wall includes a metallic alloy.

In a further embodiment of any of the foregoing embodiments, the wall includes an aluminum alloy.

A further embodiment of any of the foregoing embodiments includes a gear assembly, and the fan is coupled to be driven by the turbine section through the gear assembly.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 5 illustrates a representation of a wall thickness distribution that includes local thick portions and local thin portions.

FIG. 6 illustrates an example fiber-reinforced polymer matrix composite material of a variable area fan nozzle.

FIGS. 7A and 7B illustrate finite element analysis of fan nozzles under a bending strain mode.

FIGS. 8A and 8B illustrate another finite element analysis of fan nozzles under a torsion strain mode.

DETAILED DESCRIPTION OF THE PREFERRED EMBODIMENT

Figure 1:
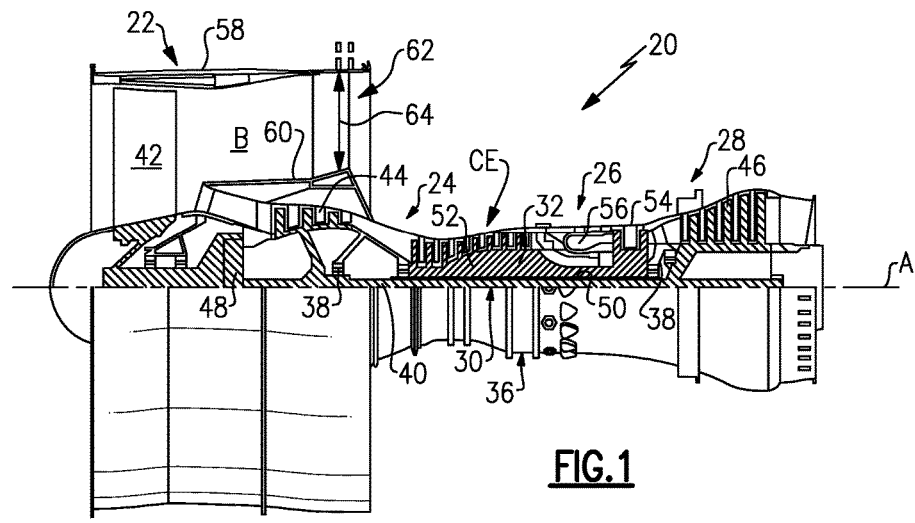
FIG. 1 schematically illustrates an example gas turbine engine.
Figure 2:
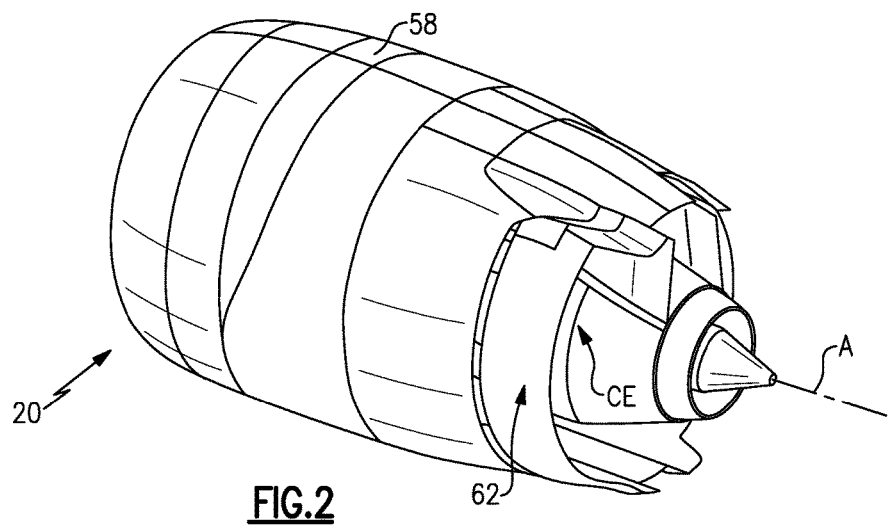
FIG. 2 illustrates a perspective view of the gas turbine engine of FIG. 1.

FIG. 1 schematically illustrates an example gas turbine engine 20, and FIG. 2 illustrates a perspective view of the gas turbine engine 20. The gas turbine engine 20 is disclosed herein as a two-spool turbofan that generally incorporates a fan section 22 and a core engine CE that includes a compressor section 24, a combustor section 26 and a turbine section 28 generally disposed along an engine central longitudinal axis A. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 includes a low pressure spool 30 and a high pressure spool 32 mounted for rotation about the engine central longitudinal axis A relative to an engine static structure 36 via several bearing systems 38. It should be understood that various bearing systems 38 at various locations may alternatively or additionally be provided.

The low speed spool 30 generally includes an inner shaft 40 that typically couples a fan 42, a low pressure compressor 44 and a low pressure turbine 46. In the illustrated embodiment, the inner shaft 40 is connected to the fan 42 through a geared architecture 48 to drive the fan 42 at a speed different than the low speed spool 30, in this case slower than the spool 30. The high speed spool 32 includes an outer shaft 50 that couples a high pressure compressor 52 and high pressure turbine 54. An annular combustor 56 is arranged between the high pressure compressor 52 and the high pressure turbine 54. The inner shaft 40 and the outer shaft 50 are concentric and rotate via bearing systems 38 about the engine central longitudinal axis A which is typically collinear with their longitudinal axes.

A fan nacelle 58 extends around the fan 42. A core nacelle 60 extends around the core engine CE. The fan nacelle 58 and the core nacelle 60 define a bypass passage or duct B therebetween. A variable area fan nozzle (VAFN) 62 extends at least partially around the central longitudinal axis A and defines an exit area 64 of the bypass passage B. The VAFN 62 is selectively movable in a known manner to vary the exit area 64.

The compressor section 24 moves air along a core flowpath for compression and presentation into the combustor section 26, then expansion through the turbine section 28. The core airflow is compressed by the low pressure compressor 44 and the high pressure compressor 52, mixed and burned with fuel in the combustor 56, then expanded over the high pressure turbine 54 and low pressure turbine 46. The turbines 46, 54 rotationally drive the respective low pressure spool 30 and high pressure spool 32 in response to the expansion.

In a further example, the engine 20 is a high-bypass geared aircraft engine that has a bypass ratio that is greater than about six (6), with an example embodiment being greater than ten (10), the gear assembly 48 is an epicyclic gear train, such as a planetary or star gear system or other gear system, with a gear reduction ratio of greater than about 2.3:1 or greater than about 2.5:1 and the low pressure turbine 46 has a pressure ratio that is greater than about 5. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary.

Most of the thrust is provided through the bypass passage B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7)^{0.5}]$.

The "Low corrected fan tip speed" as disclosed herein according to one non-limiting embodiment is less than about 1150 ft/second.

Figure 3:
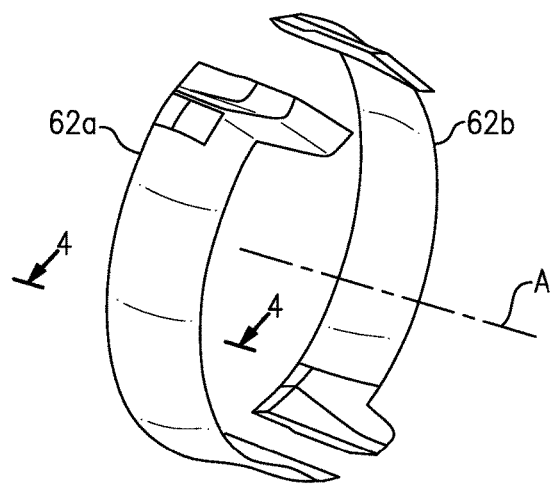
FIG. 3 illustrates a perspective, isolated view of a variable area fan nozzle.

FIG. 3 illustrates a perspective, isolated view of selected portions of the VAFN 62. As shown, the VAFN 62 is a bifurcated design that includes a first VAFN section 62a and a second VAFN section 62b. In general, each of the VAFN sections 62a and 62b are semi-circular and extend around the central longitudinal axis A of the engine 20.

Figure 4:
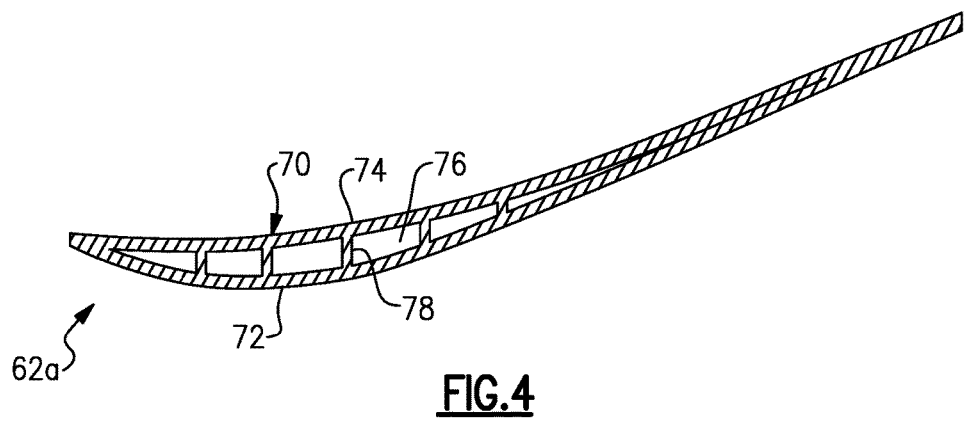
FIG. 4 illustrates a cross-section through a variable area fan nozzle.

FIG. 4 schematically illustrates a cross-section through the first VAFN section 62a. It is to be understood that the geometry of the first VAFN section 62a is exaggerated for the purpose of this description and is not a limitation to the disclosed geometry. It is to be further understood that the second VAFN section 62b is of similar construction and geometry as the first VAFN section 62a. In this example, the VAFN section 62a includes a body 70 that extends at least partially around the central longitudinal axis A of the engine 20. The body 70 includes a radially outer wall 72 and a radially inner wall 74 that together form the overall shape of the body 70 and thus the VAFN section 62a. In this example, the body 70 generally has an airfoil cross-sectional shape. That is, the walls 72 and 74 of the body 70 form a wing-like shape to provide a reaction force via Bernoulli's principle with regard to air flow over the walls 72 and 74.

In this example, the VAFN section 62a is a hollow structure. Thus, the radially inner wall 74 is radially-inwardly spaced from the radially outer wall 72 such that there is an open space 76 between the walls 72 and 74. Optionally, the VAFN section 62a includes supports 78 extending between walls 72 and 74 from wall 72 to wall 74 to stiffen and strengthen the structure.

In operation, the first VAFN section 62a and the second VAFN section 62b are selectively moveable to vary the exit area 64 of the engine 20. For example, the VAFN sections 62a and 62b are movable between at least a stowed position and a deployed position such that in the deployed position a greater exit area 64 is provided.

Airflow through the bypass passage B flows over the radially inner wall 74 and, at least when the VAFN 62 is in the deployed position, also over the radially outer wall 72. The airflow over the VAFN 62 causes vibrations in the VAFN sections 62a and 62b. Depending upon, for example, the weight of the VAFN 62, certain vibration modes (i.e., frequencies), can cause the VAFN sections 62a and 62b to flutter. Flutter is an aeroelastic event where the aerodynamic forces due to vibration, in combination with the natural mode of vibration, produce a significant and periodic motion in the VAFN sections 62a and 62b. The flutter can, in turn, elevate stresses at certain locations, cause the VAFN 62 to contact the fan nacelle 58 or damage the VAFN 62. As will be described in more detail below, the disclosed VAFN 62 includes a strategic wall thickness distribution to reduce flutter and thereby enhance the durability of the VAFN 62 and engine 20. As can be appreciated, the wall thickness distribution also provides a mechanical property distribution because relatively thin and thick sections differ in at least stiffness.

FIG. 5 shows a representation of a wall thickness distribution 80 of the radially outer wall 72, the radially inner wall 74 or both of the first VAFN section 62a. That is, the walls 72 and 74 may have equivalent or similar wall thickness distribution 80 or, alternatively, have dissimilar wall thickness distributions 80. In that regard, in one embodiment, the radially outer wall 72 has a first wall thickness distribution and the radially inner wall 74 has a second wall thickness distribution that is different than the first wall thickness distribution.

The wall thickness distribution 80 is represented by a plurality of thickness zones 82. As an example, the walls 72 and 74 are made of a fiber-reinforced polymer matrix material and the thickness zones 82 represent one or more layers or plies in a multi-layered structure of the material. In that regard, each of the layers or plies that represents the thickness zone 82 is selected to have predetermined thickness such that when the layers of all of the thickness zones 82 are stacked and formed into the wall 72 or 74, the difference in the individual thicknesses of the layers produce local thick portions 84/86, and local thin portions 88/90.

In this example, each of the thickness zones 82 is represented as a percent thickness, X %, Y % or Z %, of a preset maximum thickness of the thickness zones 82. As an example, X %<Y %<Z %. In a further example, X % is less than 40%, Y % is from 40-60% and Z % is greater than 60%. In a further example, the present maximum thickness of one thickness zone 82 is 0.5 inches (1.27 centimeters) or less. In embodiments, the thickness of a layer or ply, and thus the percent thickness, is established by changing the fiber density, fiber volume percent or area weight of polymer of the layer or ply. Alternatively, each layer or ply is made up of sub-layers or sub-plies, and the number of sub-layers or sub-plies is changed to alter percent thickness.

For a given location or portion of the wall 72 or 74, the overall thickness, as represented in FIG. 5, is determined by the sum of the thicknesses of the thickness zones 82 in the particular location. Thus, the local thick portions 84/86 have thicknesses represented at 84a/86a, and the local thin portions 88/90 have thicknesses represented at 88a/90a. That is, the thickness 84a is the sum of the thickness zones 82 (in the vertical column) of X %, Y %, Z %, Y % and X %. Similarly, the thicknesses 86a, 88a and 90a are determined by the sum of the thickness zones 82 in the respective vertical columns at those locations.

In a further example, the local thin portions 88/90 have a minimum thickness, thickness 88a, and the local thick portions 84/86 have a maximum thickness, thickness 84a. The minimum thickness 88a is 90% or less of the maximum thickness 84a. In a further example, the minimum thickness 88a is 80% or less of the maximum thickness 84a. In another embodiment, the minimum thickness 88a is 70% or less of the maximum thickness 84a, and in a further example the minimum thickness 88a is 60% or less of the maximum thickness 86a. Additionally, in a further example, the arrangement of the local thick portions 84/86 and the local thin portions 88/90 with respect to location from the leading end to the trailing end of the VAFN section 62a is a repeating pattern or symmetric pattern.

The individual thicknesses of the zones 82, and thus the local thick portions 84/86 and local thin portions 88/90, are selected to control a flutter characteristic of the VAFN 62. In one embodiment, for a given design of a fan nozzle, which may be a fan nozzle or a variable area fan nozzle, a vibration mode is determined that causes a flutter characteristic of the fan nozzle. As an example, the flutter characteristic includes an amount of flutter, location of flutter or both. The vibration mode, as used herein, includes at least one of a vibration frequency and a strain mode, such as bending strain or torsion strain. Thus, for a given vibration frequency and a given strain mode, the given design of the fan nozzle can be analyzed, such as by using finite element analysis, to determine one or more flutter characteristics of the fan nozzle.

In response to the determined vibration mode, the wall thickness distribution 80 is established such that the radially outer wall 72, the radially inner wall 74 or both include local thick portions 84/86 and local thin portions 88/90 that alter the flutter characteristic. Without being bound to any particular theory, at a given location, the local thickness of the respective wall 72 and/or 74 influences the flutter characteristic at that location. In general, at each local location, the local wall thickness is reduced or minimized to alter the flutter characteristic and thus also reduce or minimize the overall weight.

In a further example, the fiber-reinforced polymer matrix material of the walls 72 and 74 of the VAFN 62 are made of a multi-layered structure, wherein each layer includes unidirectionally oriented fibers. In one example, the multi-layered structure includes 0°/90° cross-oriented layers and +/−45° cross-oriented layers. As shown in FIG. 6, the radially outer wall 72 in a further example includes a region 92 of 0°/90° cross-oriented layers and a region 94 of +/−45° cross-oriented layers. It is to be understood that the disclosed example is also representative of the radially inner wall 74.

FIG. 7A illustrates an example finite element vibration mode analysis of a given VAFN section (V) that does not include the above-described wall thickness distribution 80, represented as a two-dimensional projection. At a given vibration mode frequency, the contours 96 represent regions of differing strain energy. In this example, the strain energy is a bending strain. In general, there is a relatively high amount of bending strain at a leading edge LE of the VAFN section (V).

FIG. 7B illustrates the first VAFN section 62a with the wall thickness distribution 80, represented as a two-dimensional projection. As shown, there is less bending strain energy at the leading edge LE and thus less flutter than in the given design (V).

Similarly, FIGS. 8A and 8B show the given VAFN design (V) and the first VAFN section 62a at a given vibration mode frequency under torsional strain. In the given VAFN design (V) shown in FIG. 8A, there is a significant gradient of torsional strain energy from the leading edge LE to the trailing edge TE. However, as shown in FIG. 8B, the first VAFN section 62a that has the wall thickness distribution 80 reduces the gradient from the leading edge to the trailing edge. Thus, in the examples shown in FIGS. 7A and 7B, the disclosed wall thickness distribution 80 alters the location of the flutter characteristic, and in the examples shown in FIGS. 8A and 8B, the disclosed wall thickness distribution 80 alters the amount and location of the flutter characteristic.

As indicated above, the wall thickness distribution provides a mechanical property distribution because relatively thin and thick sections differ in at least stiffness. In further examples, a mechanical property distribution can be provided with or without the wall thickness distribution of the walls 72/74 of the VAFN 62. In one example, the mechanical property distribution in accordance with a computer-simulated vibration profile of a flutter characteristic of the VAFN, as shown in FIGS. 7A, 7B, 8A and 8B, is from a variation in material chemical composition by location on one or both of the walls 72/74. For instance, materials of different chemical composition, one being a low modulus composition and another being a high modulus composition, are strategically provided in accordance with the computer-simulated vibration profile of the flutter characteristic.

In further examples, the varying chemical composition is a variation between resin compositions, between metallic alloy compositions, between ceramic compositions, or between any two of resin composition, metallic alloy composition and ceramic composition. A variation between resin compositions can be a variation between resins of the same or different base polymers. A variation between metallic alloy compositions can be a variation between the same or different base metal elements, such as between two aluminum-based alloys or between an aluminum-based alloy and a non-aluminum-based alloy. A variation between ceramic compositions can be a variation between the same or different base ceramic materials.

In another example, the mechanical property distribution in accordance with a computer-simulated vibration profile of a flutter characteristic of the VAFN, as shown in FIGS. 7A, 7B, 8A and 8B, is from a variation in material macro- or micro-structure by location on one or both of the walls 72/74. For instance, materials of different macro- or micro-structure, one being a low modulus structure and another being a high modulus structure, are strategically provided in accordance with the computer-simulated vibration profile of the flutter characteristic. In one example, the macro- or micro-structure can be a metallic macro- or micro-structure, such as differing grain structures.

In another example, material of the wall or walls 72/74 includes a cured polymeric material and the variation in macro- or micro-structure is due to the use of different curing conditions by location on the wall or walls 72/74. That is, portions of the wall or walls 72/74 are more highly cured than other portions. The highly cured portions have greater crosslinking and, therefore, a higher stiffness than the other, less cured portions.

In another example the macro- or micro-structure can be differing fiber configurations of a fiber-reinforced composite. Example fiber configurations include, but are not limited to, uni-directional, woven, braided, woven or un-woven fabrics and the like. Differing fiber configurations can also include variations of a base fiber configuration, such as different weave patterns.

In further examples, the variation in material chemical composition by location on one or both of the walls 72/74, the variation in material macro- or micro-structure by location on one or both of the walls 72/74 or both are provided using additive fabrication techniques. In an additive fabrication process, powdered material is fed to a machine, which may provide a vacuum, for example. The machine deposits multiple layers of powdered material onto one another. The layers are selectively joined to one another with reference to Computer-Aided Design data to form geometries that relate to a particular cross-section of the component. In one example, the powdered material is selectively fused using a direct laser sintering process or an electron-beam melting process. Other layers or portions of layers corresponding to negative features, such as cavities or porosity, are not joined and thus remain as a powdered material. The unjoined powder material may later be removed using blown air, for example. With the layers built upon one another and joined to one another cross-section by cross-section, a component or portion thereof, such as for a repair, can be produced. For a variation in material chemical composition, powdered materials of differing chemical composition can be used for the layers. Variation in material macro-structure can be controlled by the Computer-Aided Design data, and variation in material micro-structure may result from the use of materials that differ in chemical composition.

Figure 9:
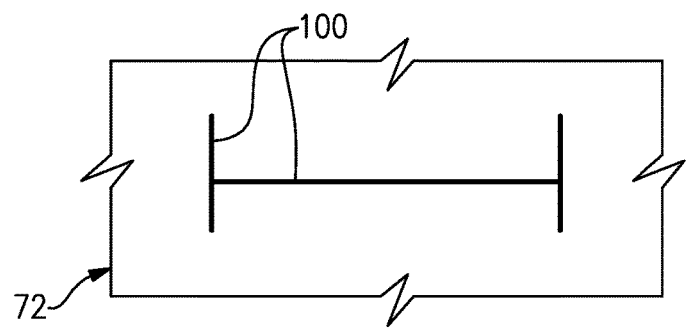
FIG. 9 illustrates a view of a broad side of a portion of the wall that has ribs that define a mechanical property distribution of the wall.

FIG. 9 illustrates a view of a broad side of a portion of the wall 72, which can also represent wall 74. In another example, as shown in FIG. 9, the mechanical property distribution in accordance with a computer-simulated vibration profile of a flutter characteristic of the VAFN, as shown in FIGS. 7A, 7B, 8A and 8B, is from ribs 100 on one or both of the walls 72/74. The ribs 100 define the mechanical property distribution by locally stiffening the wall or walls 72/74. In other words, the locations with the ribs 100 have a high modulus and locations without the ribs 100 have a low modulus, in accordance with the computer-simulated vibration profile of the flutter characteristic.

Figure 10:
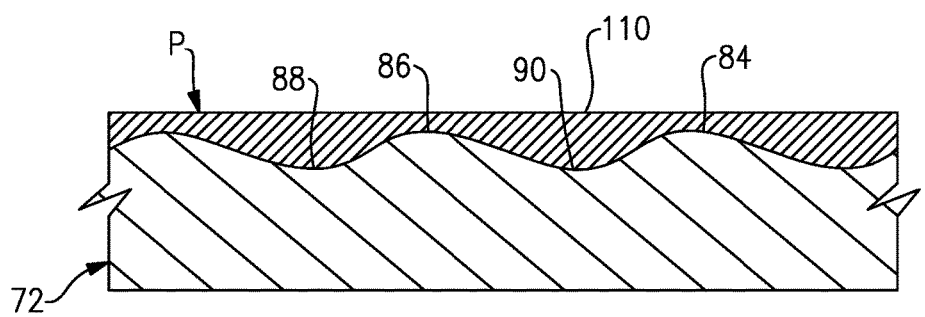
FIG. 10 illustrates a cross-section through the thickness of a wall that has locally thin and thick portions and a smoothing layer.

FIG. 10 illustrates a cross-section through the thickness of a portion of the wall 72, which can also represent wall 74. In this example, the wall 72 has a wall thickness distribution to reduce flutter and thereby enhance the durability of the VAFN 62 and engine 20. The wall 72 has local thick portions 84/86 and the local thin portions 88/90. In this example, a smoothing layer 110 is disposed over at least the local thin portions 88/90 such that the wall 72 and the smoothing layer 110 together have a smooth, non-undulating profile, represented at P. In a further example, the wall 72 is formed of a first, high modulus material and the smoothing layer 110 is made of a second, low modulus material. The smoothing layer 110 thus does not significantly influence the mechanical properties of the wall 72, such as the stiffness, but does provide the smooth, non-undulating profile, which can benefit aerodynamics of the VAFN 62.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine, comprising:
a core engine including at least a compressor section, a combustor section and a turbine section disposed along a central axis;
a fan coupled to be driven by the turbine section; and
a fan nozzle aft of the fan and defining an exit area, the fan nozzle having a body defining an airfoil cross-section geometry, the body including a wall having a controlled mechanical property distribution that varies by location on the wall in accordance with a desired flutter characteristic at the location, wherein the controlled mechanical property distribution is defined by a variation in material chemical composition by location on the wall.

2. The gas turbine engine as recited in claim 1, wherein the controlled mechanical property distribution is defined by a variation in resin compositions, a variation in metallic alloy compositions, or a variation in ceramic compositions.

3. The gas turbine engine as recited in claim 1, wherein the controlled mechanical property distribution is defined by a variation between any two of resin composition, metallic alloy composition and ceramic composition.

4. The gas turbine engine as recited in claim 1, wherein the wall is a composite material.

5. The gas turbine engine as recited in claim 1, wherein the wall includes a metallic alloy.

6. The gas turbine engine as recited in claim 1, wherein the wall includes an aluminum alloy.

7. The gas turbine engine as recited in claim 1, further comprising a gear assembly, and the fan is coupled to be driven by the turbine section through the gear assembly.

8. The gas turbine engine as recited in claim 1, wherein the variation in material chemical composition by location on the wall is defined according to a computer-simulated vibration profile.

9. A gas turbine engine, comprising:
- a core engine including at least a compressor section, a combustor section and a turbine section disposed along a central axis;
- a fan coupled to be driven by the turbine section; and
- a fan nozzle aft of the fan and defining an exit area, the fan nozzle having a body defining an airfoil cross-section geometry, the body including a wall having a controlled mechanical property distribution that varies by location on the wall in accordance with a desired flutter characteristic at the location, wherein the wall includes a cured material and the controlled mechanical property distribution is defined by a variation in crosslinking of the cured material by location on the wall.

10. The gas turbine engine as recited in claim 9, wherein the wall is a composite material.

11. The gas turbine engine as recited in claim 9, wherein the variation in crosslinking of the cured material by location on the wall is according to a computer-simulated vibration profile.

12. The gas turbine engine as recited in claim 9, further comprising a gear assembly, and the fan is coupled to be driven by the turbine section through the gear assembly.

* * * * *